US012610961B2

(12) United States Patent
Ananta et al.

(10) Patent No.: US 12,610,961 B2
(45) Date of Patent: Apr. 28, 2026

(54) PROCESS FOR PREPARING A PLANT PROTEIN CONTAINING LIQUID

(71) Applicant: SOCIETE DES PRODUITS NESTLE S.A., Vevey (CH)

(72) Inventors: Edwin Ananta, Epalinges (CH); Jan Biehl, Thun (CH); Yuxi Deng, Bern (CH); Youyun Liang, Singapore (SG); Christoph Thomas Widmer, Kehrsatz (CH)

(73) Assignee: Societe des Produits Nestle S.A., Vevey (CH)

( * ) Notice: Subject to any disclaimer, the term of this patent is extended or adjusted under 35 U.S.C. 154(b) by 492 days.

(21) Appl. No.: 18/002,542

(22) PCT Filed: Jun. 22, 2021

(86) PCT No.: PCT/EP2021/067021
§ 371 (c)(1),
(2) Date: Dec. 20, 2022

(87) PCT Pub. No.: WO2021/259940
PCT Pub. Date: Dec. 30, 2021

(65) Prior Publication Data
US 2023/0240311 A1     Aug. 3, 2023

(30) Foreign Application Priority Data
Jun. 24, 2020     (EP) ..................................... 20182106

(51) Int. Cl.
*A23J 3/34*          (2006.01)
*A23C 11/10*       (2021.01)
*A23J 1/14*          (2006.01)

(52) U.S. Cl.
CPC .................. *A23C 11/10* (2013.01); *A23J 1/14* (2013.01); *A23J 1/148* (2013.01)

(58) Field of Classification Search
CPC ... A23V 2250/5488; A23L 11/07; A23L 2/52; A23L 2/66; A23L 33/185; A23L 29/06;
(Continued)

(56) References Cited

U.S. PATENT DOCUMENTS

2011/0064847 A1     3/2011   Miwa et al.
2017/0150734 A1     6/2017   Lorand et al.

FOREIGN PATENT DOCUMENTS

CN          107404932 A     11/2017
CN          108208183          6/2018
(Continued)

OTHER PUBLICATIONS

Yanagisawa Masanobu et al. WO 2007116772, Machine Translation English, Oct. 18, 2007, pp. 1-12. (Year: 2007).*
(Continued)

*Primary Examiner* — Hong T Yoo
(74) *Attorney, Agent, or Firm* — K&L Gates LLP

(57)          ABSTRACT

The invention relates to a process for preparing a plant protein containing liquid from a defatted oleaginous plant, comprising the following steps: a) Forming a suspension of the defatted oleaginous plant in an aqueous solvent; b) Enzymatically treating the suspension obtained in step a), with the following enzymes: —at least one protein glutaminase for the solubilisation in said aqueous solvent of proteins contained in the defatted oleaginous plant, —at least one transglutaminase, said enzymes being used successively or simultaneously; c) Recovering the plant protein containing liquid obtained in step b). The Invention also relates to a plant protein containing liquid, obtained according to said process and a protein-rich food product, comprising the plant protein containing liquid obtained according to the above process.

9 Claims, 3 Drawing Sheets

(58) Field of Classification Search
    CPC . A23L 5/25; A23L 11/00; A23L 33/18; A23L
              2/84; A23C 11/103; A23C 9/152; A23C
              11/10; A23C 20/025; A23C 9/1216; A23J
              3/14; A23J 3/16; A23J 1/14; A23J 3/34;
              A23J 1/148; A23J 3/346; A23J 1/125
    USPC .................................. 435/68.1; 426/52, 656
    See application file for complete search history.

(56)                     References Cited

FOREIGN PATENT DOCUMENTS

| GB | 2119218 | A | * | 11/1983 | ........... A23C 11/103 |
| JP | H089891 | A | | 1/1996 | |
| WO | WO-2007116772 | A1 | * | 10/2007 | .............. A23L 11/31 |
| WO | 2013078510 | | | 6/2013 | |
| WO | 2020025856 | | | 2/2020 | |
| WO | 2020127358 | | | 6/2020 | |

OTHER PUBLICATIONS

Giri et al. "Processing Influences on Composition and Quality Attributes of Soymilk and its Powder" Food Eng Rev, 2012, vol. 4, pp. 149-164.

Anonymous "Okara (food)—Wikipedia" Wikipedia, Apr. 23, 2020, retrieved from the Internet at URL:https://en.wikipedia.org/w/index.php?title=Okara_(food)&oldid=952678731 [retrieved on Aug. 31, 2020], 4 pages.

Gharst et al., "The Effect of Transglutaminase Crosslinking on the Rheological Characteristics of Heated Peanut Flour Dispersions", Journal of Food Science, vol. 72, Issue No. 07, 2007, pp. C369-C375, XP055725115.

Kunarayakul et al., "Optimization of Coconut Protein Deamidation using Protein Glutaminase and its Effect on Solubility, Emulsification, and Foaming Properties of the Proteins", Food Hydrocolloids, vol. 79, 2017, pp. 197-207, XP055725984.

European Office Action for Appl No. 21 735 264.0-1105 dated Sep. 8, 2025, 8 pages.

Chong-Rong et al., "Process of Soybean Milk Powder with High Solubility, High Digestibility by Enzyme Hydrolysis-High Pressure Homogenization Treatment", Food and Nutrition in China, vol. 24, Issue No. 6, 2018, pp. 30-35.

Xiang-Hong et al., "Orthogonal Array Design for the Optimization of Rice Glutelin Modification using Glutaminase", Department of Food and Biology Engineering, Changsha University of Science and Technology, vol. 34, Issue No. 04, 2013, pp. 47-50.

Chinese Office Action for Appl No. 202180041896.6 dated Dec. 9, 2025, 8 pages.

* cited by examiner

——Peanut Press Cake 15% TS without enzyme after heat treatment

······Peanut Press Cake 15% PG, TG and amylase after heat treatment

PROCESS FOR PREPARING A PLANT PROTEIN CONTAINING LIQUID

CROSS REFERENCE TO RELATED APPLICATIONS

The present application is a National Stage of International Application No. PCT/EP2021/067021, filed on Jun. 22, 2021, which claims priority to European Patent Application No. 20182106.3, filed on Jun. 24, 2020, the entire contents of which are being incorporated herein by reference.

TECHNICAL FIELD

The present invention relates to a process for preparing a plant protein containing liquid obtained from a defatted oleaginous plant, as well as the plant protein containing liquid obtainable according to this process, and protein-rich food products comprising such a plant protein containing liquid.

BACKGROUND OF THE INVENTION

It is well known that plant-based products can be used as ingredients for protein sources in view to prepare food products, in particular beverages, such as ready to drink beverages.

Usually, these plant-based products are prepared according to sophisticated processes that provide high purity products such as plant protein isolates and plant protein concentrates.

Because of the need to carry out sophisticated processes to prepare these high purity products, their cost is high and, consequently, make the cost of food products containing them, such as ready to drink beverages, higher than dairy-based food products obtained with skimmed milk powder.

However, except for some uses, such as meat analogues or infant products, other food products and beverages, which use plant proteins as a source of bulk nutrition and/or techno-functional ingredients, do not require the purification to be at an isolate or a concentrate level.

The food industry leads to the formation of residual raw products, which are rich in proteins, and which often have no valuable outlet or even are simply disposed.

This is the case of defatted oleaginous plants, which are by-products resulting from the preparation of food grade oils. Oleaginous plants are plants which are cultivated and exploited for their parts which have high fat contents, such as their seeds or their fruits. Typically, oleaginous plants can contain up to 50% fat.

The treatment of the oleaginous plants, or parts thereof, to obtain oil, is generally carried out according to three main operations, which are:

preparing the raw material from which oil is to be extracted (in particular seeds or fruits of the oleaginous plant); during this operation, the raw material can be subjected to one or more of the following steps: cleaning, dedusting, sieving, shelling or hulling.

crushing: this operation can comprise several steps depending on the raw material to be crushed; this operation may comprise a step of grinding and extracting, at least partially, the oil contained in the raw material.

refining the oil, which consists of removing all or part of the compounds contained in the extracted oil, which make it unsuitable for use or subsequent conversion.

In addition to the crushing operation, it is possible to recover further oil from the plant by chemical extraction, with a solvent, such as water or an organic solvent.

The defatted oleaginous plants resulting from this treatment are, depending of the type of treatment, under the form of, for example, a press cake, a flour, or a meal.

These by-products are rich in protein.

Therefore, it would be interesting to recover the proteins contained in such press cakes, flours or meals, to replace the costly plant protein isolates and concentrates in food products.

Even though these affordable raw products have the advantage of being cost competitive, their protein solubility are often lower than the protein isolates/concentrates.

Since the proteins are often used as emulsifying or foaming agents, the protein solubility should not be lower than the required level.

Moreover, the insoluble proteins could increase the risk of being sandy and/or precipitating upon storage.

In order to increase the solubility of the protein, it is known to modify the solvent properties of the solution or modify the structure of the protein, in particular, by reducing its size.

However, these techniques, if they can improve the protein solubility in a certain extent, often leads to precipitation of the protein or a modification of their taste.

For example, enzymatic hydrolysis generates certain level of bitterness due to the formation of a number of bitter peptides formed along the reaction process.

Another way to theoretically increase protein solubility is to chemically modify their structure.

For food application, this can be achieved by the Maillard glycation or by enzymatic deamidation.

The Maillard glycation is quite difficult to control at the industrial scale, since once the Maillard reaction went too far, there might be unwanted colour and/or odour formation.

WO 2014/123466 discloses a process for preparing a liquid oat-base or drink of improved soluble oat protein content from an oat material, wherein the oat proteins are solubilised in an aqueous solvent by means of a protein deamidase, such as a protein glutaminase.

Protein glutaminase is a deamidation enzyme that enables to convert the glutamine residue in the substrate protein into glutamic acid/glutamate (depending on the pH of the solution).

Other authors have reported that protein glutaminase enable to increase the solubility of soybean proteins (Suppavorasatit I. et al., (2011), Journal of Agricultural and Food Chemistry, 59, 11621-11628), coconut proteins (Kunarayakul S., et al. (2018), Food Hydrocolloids, 79, 197-207), as well as the solubility of wheat gluten (Yong Y. H. et al. (2006), Journal of Agricultural and Food Chemistry, 54, 6034-6040).

In those cases, the substrates were protein isolates/concentrates but not the defatted plants.

Gharst et al., Journal of Food Science, vol. 72, N. 7, 2007, p. 369-375 describes that peanut flour dispersion proceeds to gelation at a temperature of 68° C., whereas when the dispersion is treated with transglutaminase, the gelation occurs to a higher temperature of 78° C.

The inventors have tested protein glutaminase on defatted oleaginous plant suspensions in an aqueous solvent, in particular on a peanut press cake suspension.

They noted that a great part of the proteins contained in the defatted oleaginous plant solubilized in the aqueous solvent.

However, when the solution of proteins so obtained was heated, they observed large particles are formed, providing inacceptable sandiness. These particles are usually made of or comprise coagulated proteins. It was also noted that heat treatment may render the protein solution too viscous. Now, it is usually necessary to heat the obtained protein solution in order to inactivate the enzymes (for example at 80° C.) and/or to proceed to its pasteurisation or sterilisation (for example at 120° C.).

It is therefore an object of the invention to provide a process enabling to efficiently recover the proteins contained in defatted oleaginous plants and, at the same time, enabling the liquid containing these proteins, when heated, even at the elevated temperatures carried out for pasteurisation or sterilisation, not to lead to the formation of large particles, while maintaining an acceptable viscosity.

SUMMARY OF THE INVENTION

In a first aspect of the invention, there is provided a process for preparing a plant protein containing liquid from a defatted oleaginous plant, characterized in that it comprises the following steps:

a) Forming a suspension of the defatted oleaginous plant in an aqueous solvent;
  b) Enzymatically treating the suspension obtained in step a), with the following enzymes:
    at least one protein glutaminase for the solubilisation in said liquid of proteins contained in the defatted oleaginous plant,
    at least one transglutaminase,
said enzymes being used successively or simultaneously;
  c) Recovering the plant protein containing liquid obtained in step b).

The inventors demonstrated that the enzymatic treatment by means of a protein glutaminase and a transglutaminase, allows to obtain a satisfactory solubility of the proteins contained in the defatted oleaginous plants, while preventing the formation of unwanted large particles and increase of the viscosity of the resulting liquid, upon heat treatment.

The obtaining of these effects is surprising because the used enzymes, protein glutaminase and transglutaminase, are competing enzymes, acting on the same site of the proteins.

Furthermore, the treatment with these enzymes did not generate off-taste nor unwanted odour or colour.

In a second aspect of the invention there is provided a plant protein containing liquid, that it is obtainable according to the above process.

In a third aspect of the invention there is provided a protein-rich food product, comprising the plant protein containing liquid obtainable according to the above process, and at least one food acceptable additive.

In a preferred embodiment of the invention, the enzymatic treatment of step b) is further carried out using at least one additional enzyme, namely a glycosidase.

In a further aspect, the invention relates to a plant protein containing liquid characterized in that it comprises from 2 to 6%, preferably 2 to 4% protein, from 1 to 6% fat and from 0.5 to 6% carbohydrate (weight %) and has a particle size distribution (PSD) D90 (volume) below 100 μm, more preferably at 10 to 85 μm, and more preferably at 30 to 80 μm, wherein the PSD is measured by laser diffraction.

DETAILED DESCRIPTION

Figure 1:
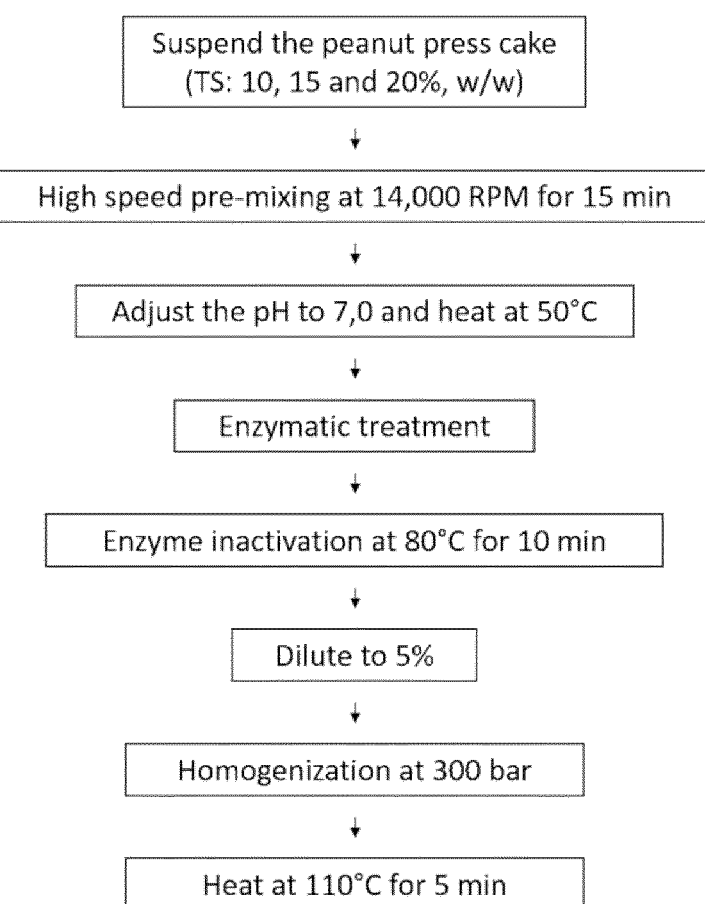
FIG. 1 represents the enzymatic process diagram for obtaining a protein containing liquid from peanut process cake.

The oleaginous plants which can be used in the process of the invention can be selected in the group comprising peanut, soybean, rapeseed, sunflower, sesame, neem, cotton, palm, coconut, shea, castor bean, corn, nuts, almonds, hazelnuts, coconut, pistachios, olives and grapes.

The term "oleaginous plant" includes the part(s) of the plant which are used for recovering oil such as, in particular, the fruits or the seeds of the plant.

Among these oleaginous plants, one prefers to use soya bean, and still more preferably peanuts, and more precisely peanut seeds.

The term "defatted" means that the oil has been totally or partially removed from the oleaginous plant.

Oleaginous plants usually contain at least 15% by weight oil, preferably at least 20% by weight oil, more preferably from 30% to 60% by weight oil (weight % with respect to the total weight of the oleaginous plant).

A defatted oleaginous plant according to the invention is usually defatted so as to contain less than 25%, generally from 0.3 to 20%, more generally from 0.5 to 15%, still more generally from 1 to 10% of non-extracted oil (weight % with respect to the total weight of the defatted oleaginous plant).

Preferably the defatted oleaginous plant according to the invention is defatted so that it contains less than 10%, more preferably from 0.3 to 10%, even more preferably from 0.5 to 8%, still more preferably from 1 to 5% of non-extracted oil (with respect to the total weight of the defatted oleaginous plant).

The defatted oleaginous plants usually contain at least 20% % by weight proteins, preferably from 25 to 60% proteins, more preferably from 35% to 60% proteins (weight % with respect to the total weight of the defatted oleaginous plant).

Generally, the oleaginous plant is crushed before step a) in order to extract its oil.

The defatted oleaginous plant can be under the form of a press cake, a flour or a meal. The defatted oleaginous plant is expected to contain between 20 to 80% proteins, preferably between 40 to 55% proteins.

According to a preferred embodiment of the present invention, the defatted oleaginous plant is a soya bean flour, peanut flour or, more preferably, a peanut press cake.

Besides, the possible residual fat, the defatted oleaginous plant also contains proteins and carbohydrates such as fibres.

According to the process of the invention, the defatted oleaginous plant is suspended in an aqueous solvent to form a suspension containing from 1 to 30%, preferably from 5 to 20%, and more preferably from 5 to 15% of the defatted oleaginous plant with respect to the total weight of the suspension (w/w %).

The aqueous solvent is preferably water.

Generally, the suspension is mixed at high speed, preferably at a speed comprised above 5000 rpm, and more preferably from 10.000 to 20.000 rpm. The high speed mixing is generally carried out for a period of 5 to 30 minutes, preferably from 10 to 25 minutes.

The mixed suspension can be heated at a temperature comprised between 30 to 70° C., preferably from 40 to 60° C.

The pH of the suspension can be adjusted at a value comprised between 5 and 8, preferably between 6.5 and 7.5, more preferably at a pH of 7.

Protein glutaminases are a family of enzymes (EC 3.5.1.44) which enables to convert the glutamine residues present in the substrate protein into glutamic acid or glutamate, with the formation of ammonium ions (depending on the pH of the solution).

Protein glutaminases which can be used in the process of the invention are those commercialised by Amano Inc. (Japan), such as the protein glutaminase PG 500.

Usually, the defatted oleaginous plant/protein glutaminase weight ratio is comprised between 50:1 to 2000:1, preferably between 250:1 to 1500:1 and more preferably from 500:1 to 1200:1.

It has been noted by the inventors that the use of low ratio of protein glutaminase with respect to the defatted oleaginous plant, for example a ratio of 500:1, enables to provide the same efficacy with respect to the solubilisation of the plant protein contained in the defatted oleaginous plant than higher ratios, for example a ratio of 100:1.

This has an important impact at the industrial scale because protein glutaminases are relatively costly and it is therefore important to diminish as importantly as possible the amounts of these enzymes.

Transglutaminases are a family of enzymes (EC 2.3.2.13) that catalyses the generation of covalent linkages between the glutamine and lysine amino acid residues present in the protein molecules. When linkages are formed, ammonia is released.

Among the transglutaminases, which can be used in the process of the present invention, one may mention the transglutaminase TG-BV commercialised by Juangsu Yiming (China).

The defatted oleaginous plant/transglutaminase weight ratio is usually comprised between 500:1 to 2000:1, preferably between 800:1 to 1500:1.

According to a preferred embodiment of the present invention, the enzymatic treatment according to step b) is carried out by means of using a third type of enzyme, namely glycosidases.

Glycosidases, or glycoside hydrolases, are enzymes which catalyse the hydrolysis of glycosidic bonds in sugar.

Glycosidases are classified into EC 3.2.1. Among the glycosidases which can be used in the process of the invention, one preferably uses alpha amylase, beta amylase, cellulose, beta-glucanase, or mixtures thereof, in particular the mixture of cellulase with beta-glucanase.

It has been indeed observed by the inventors that the enzymatic treatment of the defatted oleaginous plant may provide a certain gelatinization of the aqueous suspension. This phenomenon has been attributed by the inventors to starch gelatinization or other complex sugars gelatinization.

In the case of peanuts, this mainly results from the presence of starch. In the case of soya bean, this results from the presence of fibres.

Therefore, when the oleaginous plant is peanut seeds, under the form of a peanuts press cake, the glycosidase is preferably alpha amylase.

When the oleaginous plant is soya bean, the glycosidase is preferably a cellulase, a beta-glucanase or a mixture of a cellulase with a beta-glucanase.

The defatted oleaginous plant/glycosidase ratio is usually comprised between 200:1 to 2000:1, preferably between 700:1 to 1500:1, and more preferably between 800:1 to 1200:1.

Step b) of the process according to the invention can be carried out by using the protein glutaminase and the transglutaminase in the suspension, successively or, preferably, simultaneously.

When they are used successively, the enzymatic treatment can be made in a first step with a protein glutaminase followed by the treatment with a transglutaminase or, conversely, the transglutaminase can be used first followed by the protein glutaminase.

When a glycosidase is carried out, it can be as well used with the other enzymes successively or, preferably, simultaneously.

The enzymatic treatment is generally carried out within more than ½ hour, preferably within 1 to 6 hours, and more preferably within 2 to 4 hours After the enzymatic treatment the enzymes are inactivated, usually by heat treatment, for example at a temperature comprised between 70 to 90° C., for a period of time of 5 to 15 minutes.

The liquid obtained after the enzymatic treatment usually contains from 2 to 6% proteins, preferably from 2.5 to 6% proteins. It also contains from 0.5 to 6%, preferably from 2 to 5% carbohydrates and from 1 to 6%, preferably 1 to 3% fat.

According to a preferred embodiment, after the enzymatic treatment of step b), the liquid containing the protein solubilised from the oleaginous plant, is submitted to a homogenisation step. This homogenisation step consists in submitting said liquid to high pressure.

Usually, the pressure carried out for the homogenisation step is higher than 30 bar, preferably comprised between 100 and 400 bar, more preferably between 130 and 300 bar.

The homogenisation step can be carried out at a temperature comprised between 3° and 80° C., preferably between 4° and 60° C.

The homogenisation step usually lasts from 10 min to 2 hours, preferable from 30 to 90 min.

The homogenisation step can be performed in one or several stages, usually two stages. When it is performed in two stages, the first stage can be performed at a first pressure comprised between 100 to 350 bar, preferably between 150 and 300 bar, and the second stage can be performed at a second pressure of 30 to 90 bar, preferably between 35 and 70 bar.

The temperature at which each stage is carried out can be the same or different.

Similarly, the duration of each of the stages can be equal or different.

The homogenisation step can be carried out using conventional homogenisation devices, in particular a GEA Panda Plus 2000 homogeniser. The conditions of use of the GEA Panda Plus 2000 homogeniser are settled by the manufacturer's recommendations.

After the enzymatic treatment step and a possible homogenisation step, the liquid obtained can be submitted to a heating step in view to pasteurize or sterilize it. This step can be carried out at a temperature higher than 100° C., preferably between 12° and 150° C. the heating step lasts from 1 to 10 minutes, preferably from 3 to 8 minutes.

After this heating step, the liquid is cooled down to room temperature.

According to a further aspect of the invention, there is provided a plant protein containing liquid that is obtainable according to the process disclosed above. A plant protein containing liquid obtainable according to the process of the invention has a particle size distribution (PSD) such as the D90 (volume) is below 100 μm, preferably between 10 and 85 μm, and more preferably comprised between 30 and 80 μm. The PSD is measured by laser diffraction, The D90 is the size of at least 90% of the particles (in volume).

It generally contains from 2 to 6% proteins, preferably from 2.5 to 6% proteins. It also contains from 0.5 to 6%, preferably from 2 to 5% carbohydrates and from 1 to 6%, preferably 1 to 3% fat.

According to a third aspect of the invention, there is provided a protein-rich food product that contains the plant protein containing a liquid obtainable according to the above process, and usually, at least one food acceptable additive. The plant protein containing liquid obtained according to the process of the invention can be used as such as a food product containing protein, but usually it comprises at least one food acceptable additive.

A food products according to the invention include analogues to dairy products, such as ice creams, cream, sour cream and beverages, in particular ready-to-drink beverages like milk analogues.

The food product may comprise, in addition to the plant protein containing liquid obtained according to the invention, a fat product, such as cocoa butter or an oil, such as soybean oil, rapeseed oil, olive oil, sun flower oil. The fat product concentration can be comprised between 0.2 to 10%, preferably between 1 to 6%, more preferably between 2 to 4% (% by weight with respect to the total weight of the food product).

The food product can also comprise one or more additives selected among the followings:

sweeteners such as sugar-based sweeteners like sucrose, invert syrup, fructose syrup, glucose syrup, maltodextrins; sugarless sweeteners in particular sugar alcohols such as maltitol, xylitol, sorbitol, erythritol, mannitol, isomalt and lactitol, hydrogenated starch hydrolysates, saccharin, cyclamate, acetosulfane, an L-aspartyl-based sweetener; combinations thereof.

flavours and/or colorants;

acidifiers, i.e. an ingredient or a mixture of ingredients which contribute to increase the acidity in the product. Examples of acidifiers include lactic acid, malic acid, citric acid, tartaric acid, phosphoric acid, glucono-delta-lactone and sodium citrate or a combination thereof;

one or more vitamins and/or minerals, in particular vitamins A, B, C, D, E, K, ascorbic acid, ascorbyl palmitate, pantothenic acid, folic acid and biotin or a combination thereof; calcium, magnesium, iron, zinc, iodine, copper, phosphorus, manganese, potassium, chromium, molybdenum, selenium, nickel, tin, silicon, vanadium and boron or a combination thereof. The source of calcium can include calcium carbonate, calcium phosphate, calcium citrate, other insoluble calcium compounds. The sources of magnesium can include magnesium phosphate, magnesium carbonate, magnesium hydroxide. The sources of iron include iron ammonium phosphate, ferric pyrophosphate, ferric phosphate, ferrous phosphate, other insoluble iron compounds, amino acids, iron chelating compounds such as EDTA.

prebiotics; a "prebiotic" is to be understood as a non-digestible food ingredient that promotes the growth of beneficial microorganisms in the intestines. Non-limiting examples of prebiotics include fructooligosaccharides, inulin, lactulose, galactooligosaccharides, soyo-ligosaccharides, xylooligosaccharides, isomaltooligosaccharides, gentiooligosaccharides, lactosucrose, glucooligosaccharides, pectioligosaccharides, resistant starches, sugar alcohols or a combination thereof.

one or more stabilizer system. A "stabilizer system" is to be understood as an ingredient or a mixture of ingredients which contributes to the physical stability of the food product with respect to shelf life.

one or more thickeners, gelling agents and emulsifiers such a gums like locust bean gum, xanthan gum, starch, pectin, microcrystalline cellulose, carboxymethyl cellulose and carrageenan are non-limiting examples of stabilizer systems that can be used according to the invention alone or in combination thereof.

one or more preservatives and/or antioxidants, such as acetic acid, ascorbic acid, calcium ascorbate, arythorbic acid, iso-ascorbic acid, potassium nitrate, potassium nitrite, sodium ascorbate, sodium nitrate, sodium nitrite, ethyl lauroyl arginate, propionic acid, sodium sorbate, sorbic acid, dimethyl dicarbonate and butylated hydroxyanisole.

additional proteins from animal or vegetal origin, in particular milk proteins.

A protein-rich food product according to the invention usually contains from 1 to 10%, preferably from 2 to 6% and more preferably from 2 to 4% weight proteins from an oleaginous plant (% by weight with respect to the total weight of the food product).

Any reference to prior art documents in this specification is not to be considered an admission that such prior art is widely known or forms part of the common general knowledge in the field.

As used in this specification, the words "comprises", "comprising", and similar words, are not to be interpreted in an exclusive or exhaustive sense. In other words, they are intended to mean "including", but not limited to.

The invention is further described with reference to the following examples. It will be appreciated that the invention as claimed is not intended to be limited in any way by these examples.

Material and Methods

The material and methods used to perform the following examples are described thereafter.

Peanut press cake: provided by Wilmar (China); contained about 52.5% (N-factor 6.25) proteins, 5.7% moisture, 1.0% fat and 31.4% carbohydrates.

Enzymes: protein glutaminase (PG500) from AMANO enzymes (Japan) at a ratio flour to PG of 100-500:1 (w/w); α-amylase (BAN 480 L) from Novoenzyme (Denmark) at a ratio flour to amylase of 1000:1; transglutaminase (TG-BV) from Jiangsu Yiming (China) at a ratio flour to TG of 1250:1. These enzymes were used as supplied.

Solubility: measured at pH 7.0 based on Kjeldahl method using a Büchi B-339 equipment according to the manufacturer's recommendations. N-factor 6.25 is used to calculate the protein content. The reason is to obtain a better comparison of results with specification from suppliers.

Particle size distribution (PSD) analysis: the liquid PSD analysis was performed using Malvern's laser diffraction equipment (Malvern Mastersize 2000). According to this quantitative method, the PSD D [V,0.9] (or D90 in volume) has been determined.

Differential Scanning calorimetry (DSC): the denaturation temperature of peanut protein was measured with DSC.

Moisture analysis: measured according to Karl Fischer's method.

Viscosity analysis: measured using a Thermo Haake RS6000 coupled with UMTC thermocontroler settled according to the manufacturer's recommendation with a flow curve of 0-300 $s^{-1}$ in 180 seconds at 25° C. The data are collected every two seconds.

EXAMPLES

Example 1: Enzymatic Treatment Process of the Peanut Press Cake

A peanut press cake is suspended in water in order to obtain three suspensions comprising respectively 10, 15 or 20% w/w total solids (TS). The suspensions are pre-mixed at 14 000 RPM for 15 minutes. The pH is then adjusted to 7.0 and the suspensions are heated at 50° C. The proteins in the suspensions are then digested using a mixture of enzymes for up to 4 hours. The mixture contains α-amylase, protein glutaminase (PG), transglutaminase (TG) or a combination thereof.

After the enzymatic treatment, the enzymes are inactivated by raising the heating temperature to 80° C. for 10 minutes. The suspensions are then diluted to 5% TS and homogenized under a pressure of 300 bar.

Afterwards, the suspensions are treated at ultra-heat temperature (UHT) pasteurization at 110° C. for 5 minutes.

The diagram of this process as described above is illustrated by FIG. 1.

Example 2: Effects of the Homogenization on the Solubility of the PG Treated Peanut Protein at pH 7.0

In the absence of any treatment (homogenization or enzymatic treatment), the solubility of peanut protein in the press cake was 40%.

When the samples were treated with either PG alone (in the conditions given in example 1), or by the homogenization step alone, the solubility of the proteins increased to respectively 66% and 64%.

Finally, after the PG treatment, the samples that were further treated with homogenization were found to have the highest solubility (88%).

In these experiments, the homogenization step was carried out in two stages: a first stage at 200 bar at 70° C., a second stage at 50 bar at 70° C.

This means that the protein can be more liberated and solubilized by combining the two techniques.

Figure 2:
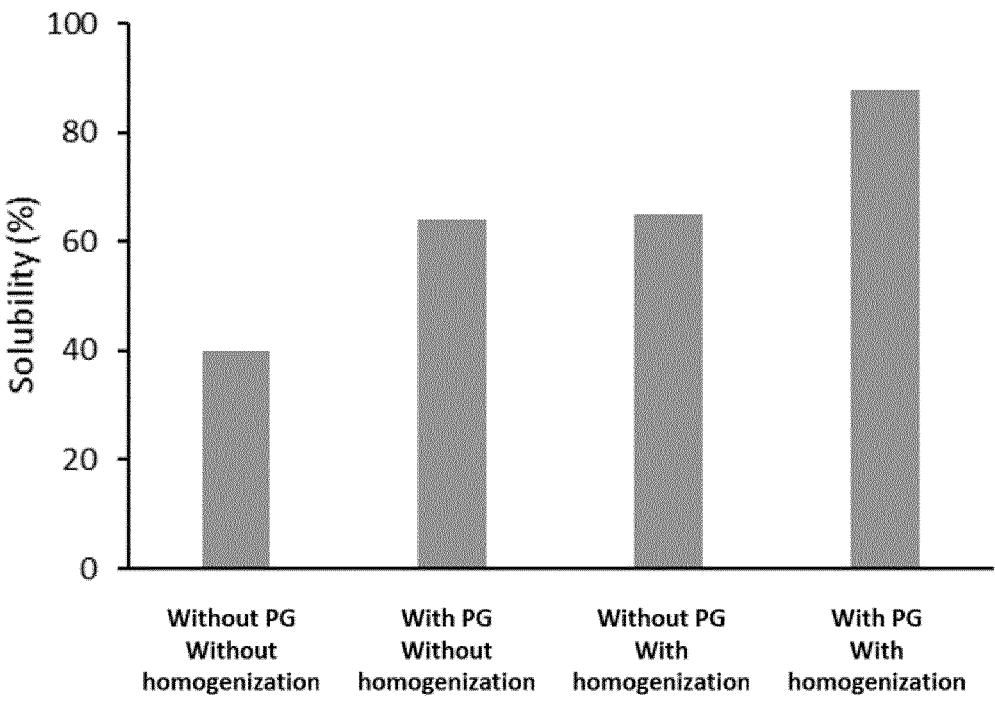
FIG. 2 shows the synergetic effects between homogenization and protein glutaminase (PG) treatment on peanut protein solubility at pH 7.0.

These results are reported in FIG. 2. They show that the PG treatment and homogenization step enable to notably improve the solubilisation of the peanut proteins.

Example 3: Solubility of Peanut Protein at pH 7.0 after Enzymatic Treatment with (i) PG with α-Amylase and (ii) PG with α-Amylase and Transglutaminase (TG)

It was expected that TG decreases the solubility of the peanut proteins, since TG and PG compete on the same amino acids on the protein.

Therefore, the impact of the combination of PG with TG on peanut flour protein solubility was investigated. The solubility of the proteins was measured after a treatment with PG and α-amylase, or after a treatment with PG, α-amylase and TG.

The flour to PG ratio was 500:1, the flour to TG ratio was 1250:1 and the flour to α-amylase 1000:1.

Figure 3:
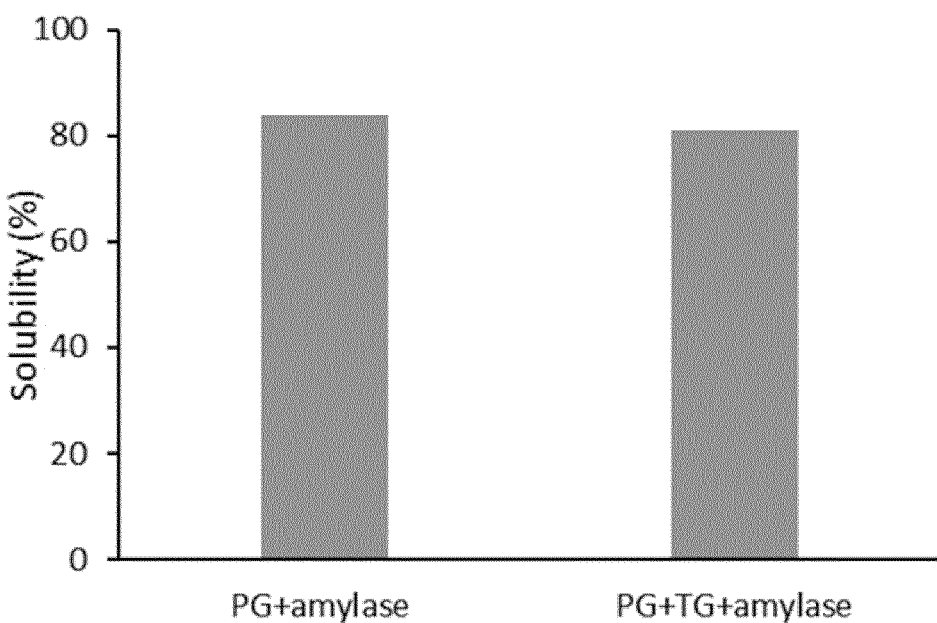
FIG. 3 represents the solubility of peanut protein at pH 7.0 after enzymatic treatment either with a combination of protein glutaminase and α-amylase or with a combination protein glutaminase, transglutaminase and α-amylase.

The results of these experiments are reported in FIG. 3.

They show that, unexpectedly, the solubility of the proteins was similar under both conditions.

These results demonstrate that the addition of TG does not decrease the solubility of peanuts proteins.

Example 4: PSD Results after Treatment with PG Alone, with PG and Heat and with PG, Heat and TG The PSD was measured on three peanut protein solutions obtained from peanut flour suspensions treated with PG alone; with PG and heat (110° C. for 5 minutes); and with PG, TG and heat (110° C. for 5 minutes).

Figure 4:
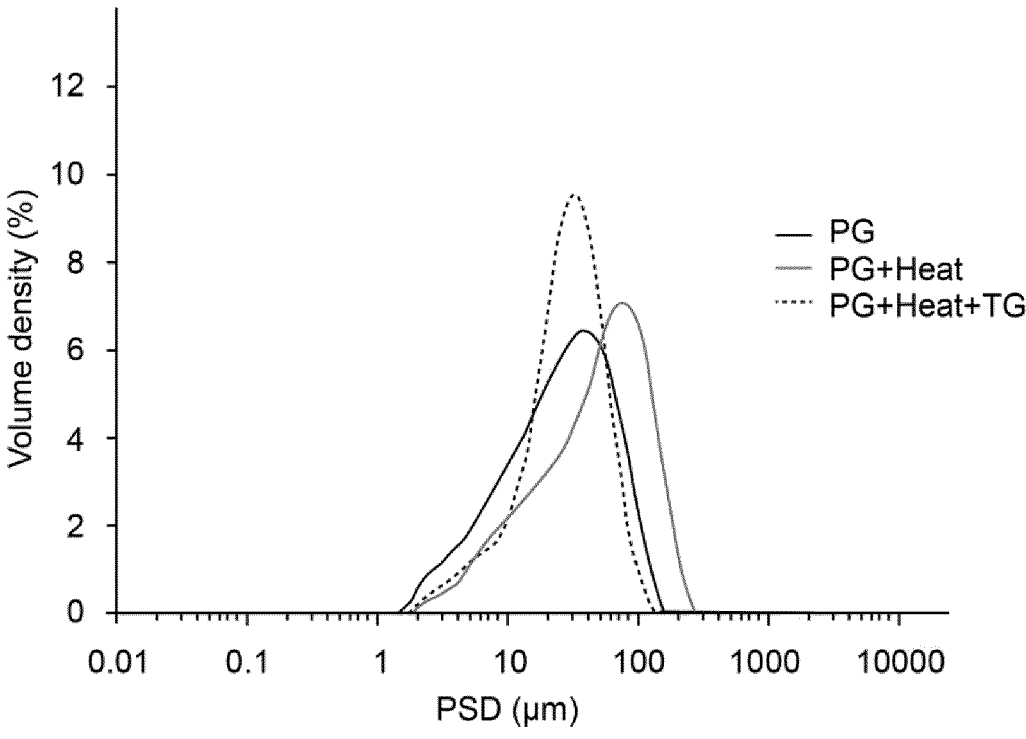
FIG. 4 represents the Particle Size Distribution (PSD) results of protein glutaminase treated samples (i) without heat treatment and without transglutaminase, (ii) with heat treatment and without transglutaminase and (iii) with heat treatment and with transglutaminase.

The results obtained are reported on FIG. 4.

They show that the solution that undergoes an enzymatic treatment with PG alone has a PSD D90 of 74 μm (grey curve). When the solution went through a PG and heat treatment at 110° C. for 5 minutes, the PSD D90 increased to 129 μm (black curve), and large aggregates were visible.

After the treatment with PG, TG and heat together (dotted curve), the solution had a PSD D90 of 60 μm and no aggregates formation were observed.

Moreover, no off-taste or odour were generated, and the sandiness of the sample was reduced.

Example 5: Effects of the Enzymatic Treatment with PG, α-Amylase and TG on the Viscosity of Peanut Protein Solutions A peanut press cake was suspended and mixed at 14,000 RPM. The suspension was divided into two parts. One part was treated, at pH 7.0, with a mixture of protein glutaminase (PG), α-amylase and transglutaminase (TG). The PG ratio to flour was 1000:1, TG ratio to flour was 1250:1 and the α-amylase ratio to flour was 1000:1. The second part was left untreated.

Both suspensions underwent a heat treatment at 120° C. for 2 minutes mimicking a UHT treatment.

Figure 5:
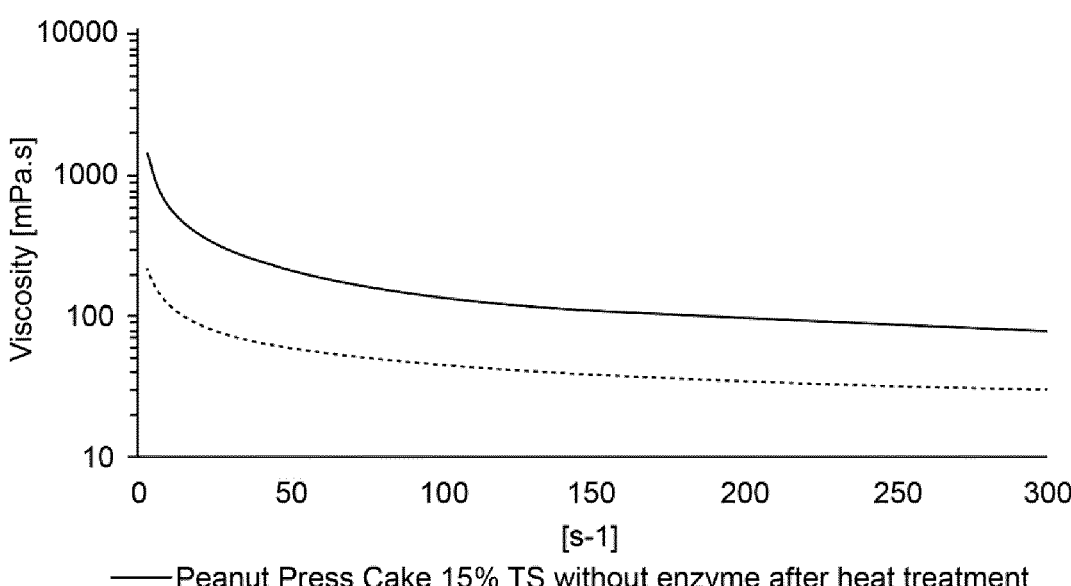
FIG. 5 represents the effect of enzymatic treatment on the viscosity of peanut protein solutions.

The results of these experiments are reported in FIG. 5.

They show that the viscosity of the enzymatically treated suspension was significantly lower in comparison to the non-enzymatically treated suspension.

Viscosity is due to the starch gelatinization and to the protein denaturation that occurs when proteins undergo a heat treatment.

These results demonstrate that the enzymatic treatment with PG, TG and α-amylase is effective in reducing the viscosity of the suspensions by preventing these phenomena.

Example 6: Preparation of a Protein-Rich
Ready-to-Drink Beverage Containing a Peanut
Protein Containing Liquid and Aseptic Filling of
the Beverage in a Packing Box A peanut press cake was collected from an oil-mill. It contained 52.5% proteins, 3% carbohydrates and was free of fat. It was suspended in water in order to obtain 15% w/w total solids (TS). The suspension was pre-mixed at 14 000 RPM for 15 minutes. The pH was adjusted to 7.0 and the suspension was heated at 50° C.

The proteins in the suspension were digested using a mixture of enzymes containing α-amylase at a ratio to flour 1000:1, transglutaminase at a ratio to flour 1250:1 and protein glutaminase at a ratio to flour 500:1. The enzymatic digestion lasted for 2 hours. The enzymes were then inactivated by raising the temperature to 80° C. for 10 minutes. The suspension was then diluted to 5.7% TS and mixed with other ingredients and homogenized under a pressure of 300 bars. Afterwards, the suspension was treated at ultra-heat temperature (UHT) pasteurization in a two-step process, first at 95° C. for 60 seconds and then at 120° C. for 5 minutes.

The proportions of the ingredients are indicated in Table 1. They were mixed in sterile conditions. The protein-rich ready-to-drink beverage finally obtained was aseptically filled into a sterilized packing box.

TABLE 1

Proportions of the ingredients used to prepare the protein-rich
ready-to-drink beverage

| Hydrolyzed peanut press cake (% w/w) | Sucrose (% w/w) | Vegetable oil (% w/w) | Flavorings (% w/w) | Gum (% w/w) | Total solids (% w/w) | H20 |
|---|---|---|---|---|---|---|
| 5.7 | 2.8 | 3 | 0.15 | 0.1 | 11.75 | qs 100% |

The invention claimed is:

1. A process for preparing a plant protein containing liquid from a defatted oleaginous plant, comprising the following steps:

a) forming a suspension of the defatted oleaginous plant in an aqueous solvent, wherein the defatted oleaginous plant is a peanut press cake;
b) enzymatically treating the suspension obtained in step a), with the following enzymes:
at least one protein glutaminase for the solubilisation in the aqueous solvent of the plant proteins contained in the defatted oleaginous plant, wherein the defatted oleaginous plant/protein glutaminase weight ratio is comprised between 50:1 to 2000:1,
at least one transglutaminase, and
at least one glycosidase,
the enzymes being used successively or simultaneously; and
c) obtaining the plant protein containing liquid, wherein the plant protein is recovered from the defatted oleaginous plant.

2. The process according to claim 1, wherein the defatted oleaginous plant has been defatted to contain less than 25% by weight of non-extracted oil with respect to the total weight of the defatted oleaginous plant.

3. The process according to claim 1, wherein the defatted oleaginous plant has been crushed before step a) in order to extract its oil.

4. The process according to claim 1, wherein the defatted oleaginous plant contain at least 20% by weight proteins with respect to the total weight of the defatted oleaginous plant.

5. The process according to claim 1, wherein, after step b), an homogenisation step is carried out at a pressure higher than 30 bar.

6. The process according to claim 1, wherein the defatted oleaginous plant has been defatted to contain from 0.3% to 20% by weight of non-extracted oil with respect to the total weight of the defatted oleaginous plant.

7. The process according to claim 1, wherein the aqueous solvent is water.

8. The process according to claim 1, wherein the defatted oleaginous plant/transglutaminase weight ratio is between 500:1 and 2000:1.

9. The process according to claim 1, wherein the defatted oleaginous plant/glycosidase weight ratio is between 200:1 and 2000:1.

* * * * *